Patented Aug. 4, 1942

2,291,794

UNITED STATES PATENT OFFICE 2,291,794

COATING AND IMPREGNATING PRODUCT AND PROCESS

Ivor M. Colbeth, East Orange, N. J., assignor to The Baker Castor Oil Company, New York, N. Y., a corporation of New Jersey No Drawing. Original application May 1, 1935, Serial No. 19,198. Divided and this application August 17, 1939, Serial No. 290,605

4 Claims. (Cl. 106—244)

This invention relates to a product or composition that is especially useful for coating or impregnating surfaces. It is very useful because the product is insoluble in all ordinary solvents, such as ether, alcohol, acetone, benzol, carbon disulphide, water, turpentine, etc. This is a division of my application Serial No. 19,198, filed May 1, 1935, now Patent 2,172,955.

The insoluble product is derived from castor oil, which has been oxidized, or sulphurized, or oxidized and sulphurized. Certain organic solvents will become absorbed in the product if allowed to remain in contact therewith for very long intervals of time and the product will become swollen to some extent, but a complete solution will not be formed.

It is already known that when castor oil is oxidized until it becomes sufficiently viscous to form a gel or solid, the oxidized product is not soluble in ordinary solvents. Heretofore, such oxidized product has been placed in colloidal solution by mixing it in a dough mixer for several hours and then adding an organic solvent and thoroughly stirring or grinding. Also nitrocellulose containing a considerable percentage of alcohol has been mixed with such viscous products, after which the mixture has been dissolved in solvents. In addition, finely divided pigments have been added to such oxidized castor oil, an organic solvent added and grinding continued until a solution was obtained. But the colloidal solution obtained by adding a solvent and mixing in a dough mixer is not stable but will gel if the solution is permitted to stand for some time, although the solutions prepared by adding nitrocellulose and alcohol and by adding a finely divided pigment appear to remain fluid.

By the present invention, castor oil is oxidized or sulphurized or oxidized and sulphurized until it forms a gel or becomes sufficiently viscous to be almost solid and it is then mixed in a mixer with a sufficient quantity of triethanol glycol ethyl ether to cause the mixture to form an emulsion when the mixture is diluted with water. The sulfurization, or oxidation and sulfurization, of the oil may be accomplished by treating the castor oil at ordinary room temperature without applying external heat with a solution of sulfur chloride that may be dissolved in a hydrocarbon, such as gasoline or white mineral oil, for example, as set forth in my application, Serial No. 16,582, filed April 16, 1935. The reaction is exothermic and the temperature should preferably be kept well below 100° C. The solution of sulfur chloride may be slowly poured into the castor oil while the mixture is vigorously stirred, or the oil and solution may be mixed in other ways to insure thorough mixing. The amount of sulphur chloride that is used will vary in accordance with the degree of viscosity that is desired. The viscosity increases with an increase in the amount of sulphur chloride that is used. The oxidation of the castor oil may be accomplished by oxidizing it, preferably at a temperature of about 150° F. to about 350° F. with air or ozone or ozonized air, as set forth in my application, Serial No. 719,293, filed April 6, 1934, now Patent No. 2,126,368. Or, the castor oil may be oxidized to some extent before it is further treated with sulfur chloride.

It has been found that emulsions so formed are very stable and can be brushed or spread onto surfaces to coat them, or can be used to impregnate porous materials, or the emulsions may be mixed with pigments, gums, resins, soaps, etc., and used wherever a waterproof coating or impregnating material is desired. After the water emulsion has been applied and the water has evaporated, the residue coalesces to form a continuous film which will not be dissolved by water or form an emulsion with water, unless it is again subjected to a milling process or the like. Nitrocellulose containing alcohol may be mixed with the material before an emulsion of the same with water is formed, as described above, or, if an aqueous emulsion has been formed, either with or without the nitrocellulose, other ingredients, such as latex or an emulsion of rubber, drying oils, paints, resins, etc., may be added and aqueous emulsions subsequently formed which can be spread or otherwise applied to surfaces to serve as waterproofing coatings or impregnating materials.

The following is given as a specific example of carrying out the invention, but it is to be understood that the invention is not to be restricted to the particular materials, or the specific details that are described.

Castor oil is oxidized until it becomes substantially solid or until it is viscous. About 10 to 50% of diethylene glycol ethyl ether is mixed with the oxidized product and this mixture is stirred in water, which forms the emulsion. The dilution of the emulsion will depend upon the amount of water that is used. When the emulsion is applied to a surface or caused to impregnate porous materials, the water evaporates and the residue coalesces into films or continuous particles filling pores of the material to which the product is applied.

I claim:

1. A composition of matter comprising substantially solid oxidized castor oil that is insoluble in ether, alcohol, acetone, benzol, carbon disulphide, water and turpentine, and a sufficient amount of diethylene glycol ethyl ether to form an emulsion when mixed with water.

2. A composition of matter comprising substantially solid oxidized castor oil, that is insoluble in ether, alcohol, acetone, benzol, carbon disulphide, water and turpentine, and about one-twentieth to one-half as much of diethylene glycol ethyl ether.

3. A stable aqueous emulsion of water, diethylene glycol ethyl ether and oxidized castor oil that in insoluble in ether, alcohol, acetone, benzol, carbon disulphide, water and turpentine.

4. A stable aqueous emulsion of water, diethylene glycol ethyl ether and oxidized castor oil that is insoluble in ether, alcohol, acetone, benzol, carbon disulphide, water and turpentine, said emulsion containing nitrocellulose.

IVOR M. COLBETH.